B. DARRACH, Jr.
METHOD OF MAKING SHIMS.
APPLICATION FILED MAY 25, 1920.

1,417,039.

Patented May 23, 1922.

INVENTOR
Bradford Darrach, Jr.
BY
Moses Hammond & Middleton
ATTORNEYS

UNITED STATES PATENT OFFICE.

BRADFORD DARRAH, JR., OF ELIZABETH, NEW JERSEY, ASSIGNOR TO LAMINATED SHIM COMPANY, INC., OF LONG ISLAND CITY, NEW YORK, A CORPORATION OF NEW YORK.

METHOD OF MAKING SHIMS.

1,417,039.　　　　　Specification of Letters Patent.　　Patented May 23, 1922.

Application filed May 25, 1920. Serial No. 384,109.

*To all whom it may concern:*

Be it known that I, BRADFORD DARRACH, Jr., a citizen of the United States, residing in Elizabeth, in the county of Union and State of New Jersey, have invented certain new and useful Improvements in Methods of Making Shims, of which the following is a specification.

This invention relates to an improved method of making shims of the type which are employed in divided bearings to hold the two sections of the bearing in spaced relation, and which comprise a body portion and an edge facing member of babbitt, or other similar metal, adapted to engage the shaft. The manner in which the shim of the type herein referred to is applied to a bearing is illustrated in Figure 1 of the patent to C. R. Short for bearing shims, No. 1,383,035, dated June 20, 1921.

The invention has for its object to provide a method by means of which shims of this type may be efficiently and economically manufactured.

In the method of manufacture previously employed, the face member of the shim was formed on the body portion thereof by a process which comprised the steps of melting the facing metal and pouring the same into place. The present invention contemplates the use of solid metal face and body portions in the process of manufacture and provides a method whereby these portions are united with each other by applied pressure.

In the accompanying drawings forming part of this application, in which I have illustrated one mode of operation involving the principles of my invention, Fig. 1 is a perspective view of the facing member of the shim;

Figure 1:
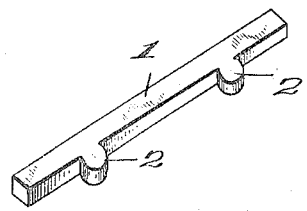
Figure 2:
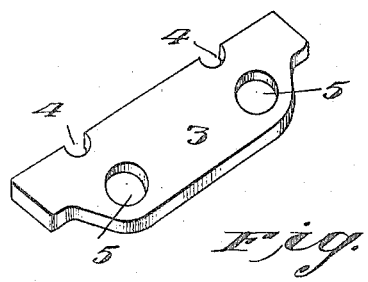
Fig. 2 is a perspective view of the body portion thereof.

Referring to the drawings, 1 indicates the facing member which is formed of Babbitt metal, or some other similar comparatively soft metal, and which is provided at its rear edge with rearwardly extending tongues 2. The body portion 3 of the shim, which is of less thickness than the facing member 1, is formed of a comparatively hard metal, such as brass or steel, and is provided at its front edge with recesses or notches 4 corresponding in shape to the shape of the tongues 2 of the facing member 1 and adapted to receive the same. The recesses 4 are slightly larger than the tongues 2 in order that the tongues may be freely inserted within the recesses when assembling the parts. The body portion 3 is further provided with holes 5 to receive the bolts which fasten the two sections of the bearing together.

Figure 3:
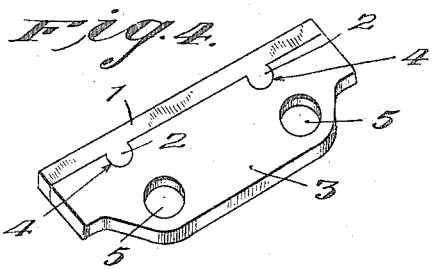
Fig. 3 is a view showing the parts of the shim in assembled position and about to be subjected to pressure.
Figure 4:
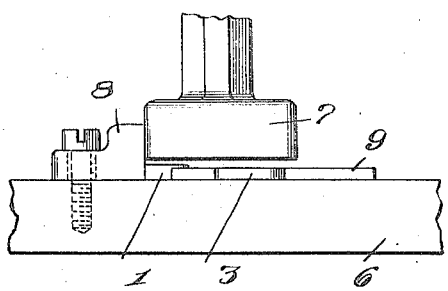
Fig. 4 is a perspective view of the finished shim.

In forming the shim, the facing member 1 and the body portion 3 are placed upon the bed 6 of a suitable press in assembled relation with the tongues 2 engaging the recesses 4, and with the rear edge of the facing member engaging the front edge of the body member, and the parts are held firmly positioned to be acted upon by the pressure member 7 by means of stops 8 and 9 attached to the bed 6 in any suitable manner. As the facing member is thicker than the body portion, its upper surface will lie in a plane above the plane of the upper surface of the body portion, as clearly shown in Fig. 3.

After the facing member 1 and the body portion 3 have been thus assembled upon the bed 6 of the press, the pressure member 7 is forced downwardly until it engages the upper surface of the body portion. As the pressure member moves downwardly, it will first engage the upper surface of the facing member and as the pressure member continues its downward movement, the facing member will be compressed, owing to the softness of the metal of which it is formed, and as the compression of the metal forming tongues 2 will result in their being expanded into intimate contact with the walls of the recesses 4, thereby effectually locking the facing member to the body portion 3. The compression of the facing member will also force the rear edge thereof into close contact with the front edge of the body portion, and if any irregularities should be present in the front edge of the portion, the soft metal of the facing member will be forced therein, thereby insuring a tight joint between the parts of the shim. It will, of course, be understood that the expanding of the metal of the facing member 1, due to the action of the pressure member 7 cannot effect movement of the parts of the shim owing to the fact that they are held rigidly against movement during the pressing operation by the fixed stops 8 and 9.

While for purposes of illustration I have shown one preferred form of shim, it will, of course, be understood that the invention is not limited thereby, as the shim may be of any desired form, and the number of holes 5, and the number and shape of the interlocking tongues 2 and recesses 4 may be varied without departing from the spirit of my invention. Furthermore, the facing member may be of less length than the length of the body portion, or if desired, separate facing members may be secured to the body portion adjacent each end thereof. It is also understood that the invention is not limited to the type of press illustrated, as any other suitable means may be employed for causing the facing member to be subjected to pressure. I therefore wish to cover by the appended claims the principles of my invention in whatever form they may be usefully employed.

Having thus described my invention, what I claim as new and desire to secure by Letters Patent, is:

1. The herein described method of making shims which consists in providing a solid soft metal facing member and a body portion, and securing the parts edge to edge by pressure.

2. The herein described method which consists in providing a body portion with locking means, providing a solid soft metal facing portion, and securing the parts to one another by forcing the metal of the facing member into intimate engagement with the locking means of the body portion.

3. The herein described method which consists in providing a body portion with locking means, providing a solid soft metal facing member with locking means adapted to co-act with the locking means of the body portion, assembling the parts, and securing the parts to one another by forcing the locking means of the facing member into intimate engagement with the locking means of the body portion.

4. The herein described method of making shims which consists in providing a solid soft metal facing member and a body portion with co-acting interlocking means, assembling the parts, and securing the assembled parts to one another by applying pressure to the facing member.

5. The herein described method which consists in providing a body portion having a recess therein, providing a facing member of soft metal having a tongue of greater thickness than the body portion and adapted to be received within the recess therein, assembling the parts with the tongue of the facing member positioned within the recess, and securing the parts to one another by applying pressure to the tongue to compress it to the thickness of the body portion, and to expand it into intimate engagement with the walls of the recess.

BRADFORD DARRACH, Jr.